June 23, 1953 P. J. CULHANE, JR 2,642,647
METHOD OF MAKING SHELL FORGINGS
Filed March 2, 1951 2 Sheets-Sheet 1

INVENTOR
Patrick J. Culhane Jr.
BY Evans + McCoy
ATTORNEYS

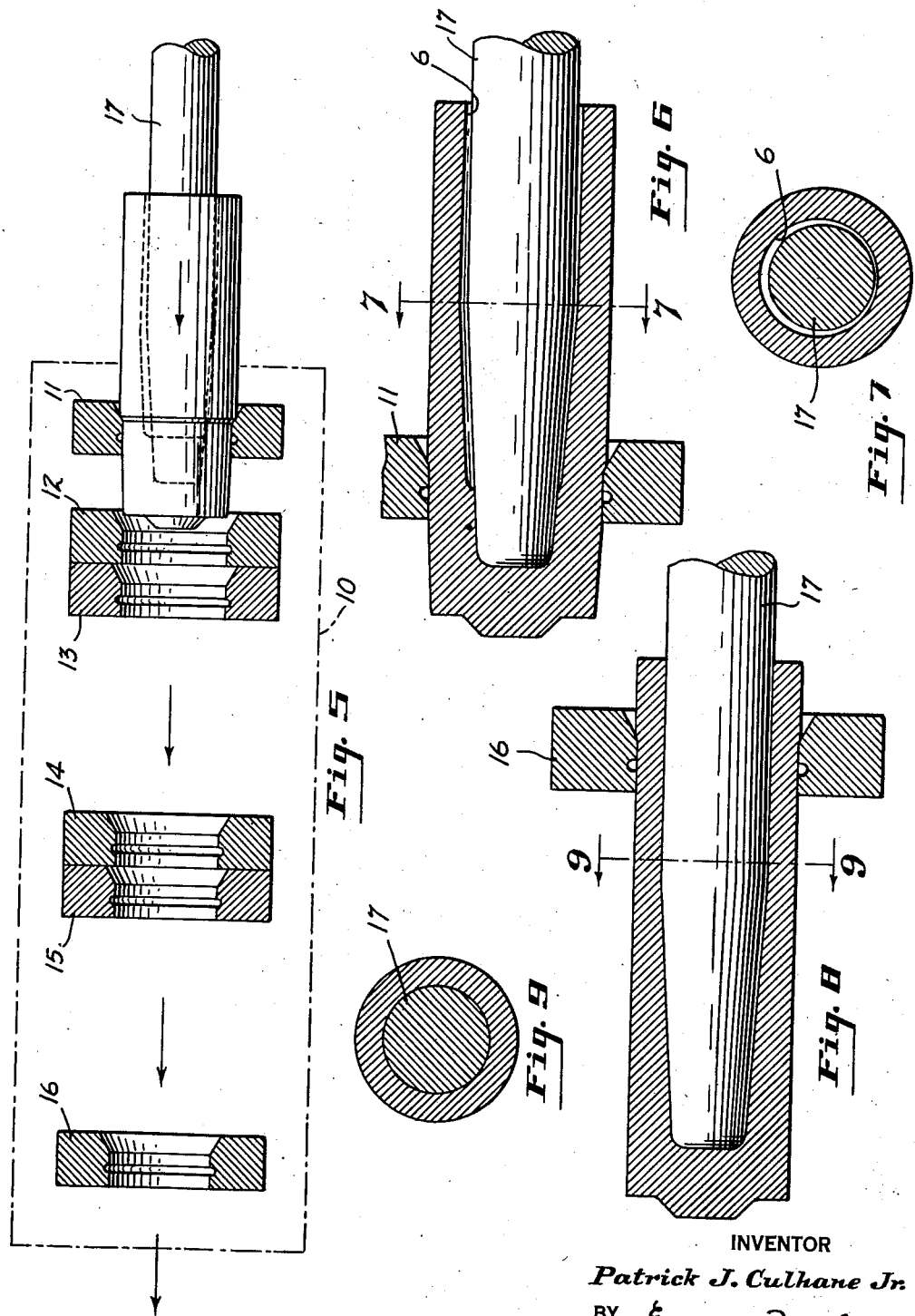

Patented June 23, 1953

2,642,647

UNITED STATES PATENT OFFICE 2,642,647

METHOD OF MAKING SHELL FORGINGS

Patrick J. Culhane, Jr., Cleveland Heights, Ohio

Application March 2, 1951, Serial No. 213,547

5 Claims. (Cl. 29—1.21)

This invention relates to a method of making shell forgings and more particularly to a method in which the shell forging is formed by forging and drawing operations.

In the manufacture of shell forgings by methods heretofore commonly used, it has been necessary to form the cup to an external diameter considerably greater than that of the finished shell to provide a wall of sufficient thickness to permit the exterior of the forging to be turned to the required diameter and into concentricity with the bore. The machining cost and scrap loss involved comprises a very substantial portion of the cost of manufacture of shell forgings by such methods, and it is the purpose of the present invention to provide a method by which the external face of the forging is accurately centered with respect to the bore so that the external diameter of the forging need be only slightly greater than that of the finished shell, and by which the machining cost and scrap losses are greatly reduced.

In the method of the present invention a billet is first formed into a cup having a cavity of a diameter substantially greater than that of the finished shell and of a depth considerably less than that of the finished shell. The cup is formed by piercing a billet positioned in a die pot with an oversized punch which preferably has a flat bottom, and then extending the cavity to full depth in the same die pot or in another of the same size by means of a second piercing punch which is of less diameter than the oversized punch and which is centered with respect to the exterior of cup, and which has a tip portion that is formed to conform to the interior of the finished shell forging. After the second piercing operation the cup is subjected to a drawing operation in which it is placed upon a mandrel shaped to conform to the interior of the finished shell forging and is forced axially through a series of die rings that are held in axial alinement with one another and with the mandrel to draw the tubular wall into engagement with the mandrel and to form a cylindrical exterior surface that is concentric with the mandrel and with the cavity which conforms to the mandrel.

Reference should be had to the accompanying drawings forming a part of this specification, in which:

Fig. 5 is a horizontal section through the draw rings for reducing the diameter of the cup in drawing the wall thereof into conformity with the centered mandrel;

Fig. 6 is a horizontal section showing the cup on the mandrel and in a position partially through the first draw ring;

Fig. 7 is a section taken on the line indicated at 7—7 in Fig. 6;

Fig. 8 is a section similar to Fig. 6, showing the cup passing through the last of the drawing rings; and Fig. 9 is a section taken on the line indicated at 9—9 in Fig. 8.

Figure 1:
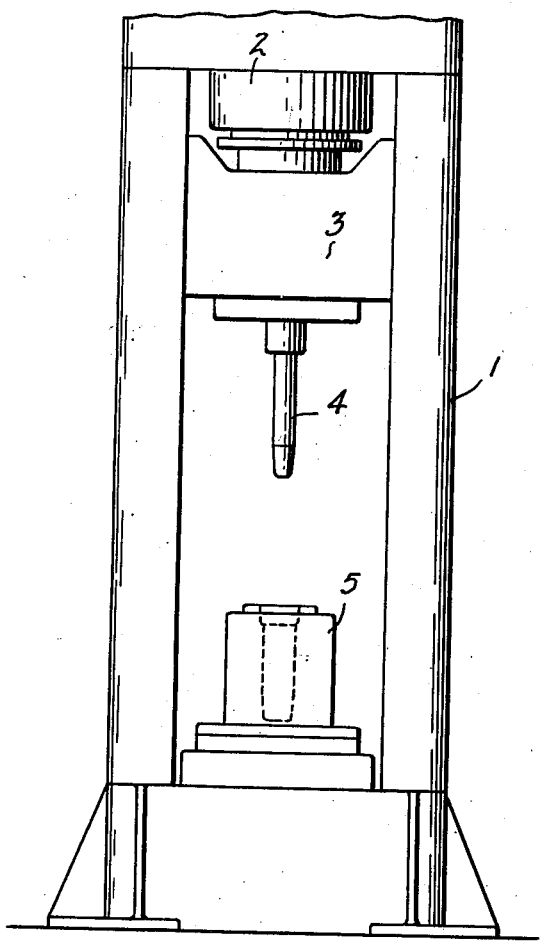
Figure 1 is a front elevation of a hydraulic press in which the piercing and bottoming operations may be performed.

Fig. 1 of the drawings shows a hydraulic press in which the forging operations may be performed, the press having a frame 1, a cylinder 2 and a crosshead 3 to which a piercing punch 4 may be attached. Beneath the crosshead 3 a suitable die pot 5 is mounted in which a heated slug is placed prior to the piercing operation.

Figure 2:
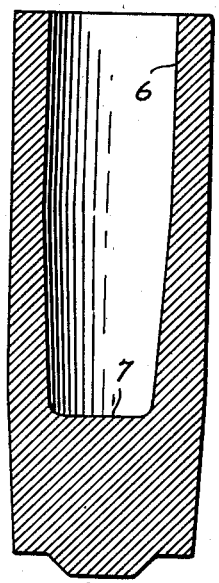
Fig. 2 is a longitudinal vertical section through the cup after the piercing operation.
Figure 3:
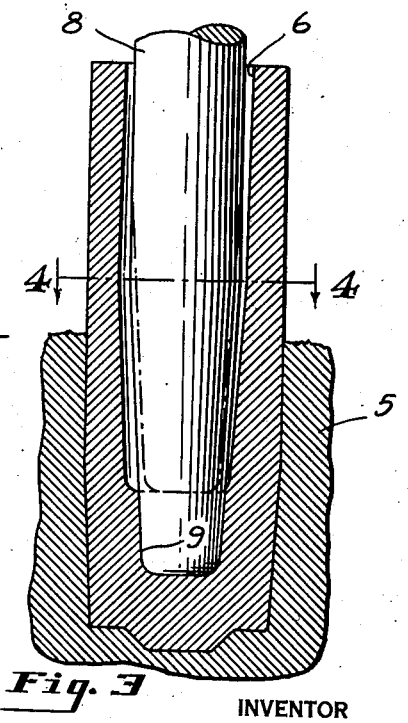
Fig. 3 is a fragmentary vertical section showing the bottoming punch at the lower end of its stroke in the cup.
Figure 4:
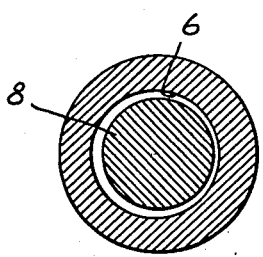
Fig. 4 is a section taken on the line indicated at 4—4 in Fig. 3.

As shown in Fig. 2 of the drawings, the punch 4 pierces the billet, expands the same into conformity with the walls of the die pot, and forms a cavity 6 the lower end of which terminates a substantial distance above the lower end of the cup. The cavity 6 is of a diameter substantially greater than in the finished shell forging and the punch 4 has a bottom so formed that a punch of smaller diameter may be readily centered in the hole formed by it. As herein shown the punch 4 has a flat bottom that forms a substantially flat bottom 7 in the cup cavity.

No way is known to entirely eliminate drifting of the punch in the piercing operation and the tendency of the punch to drift increases as the punch becomes worn. In the method of the present invention the cavity 6 formed by the piercing punch 4 is of a diameter sufficiently in excess of that of the finished forging to enable a second piercing punch 8 to be perfectly centered with respect to the exterior of the forged cup. For example, in forming the cup for a shell of eight inch diameter the piercing punch may be of a diameter as much as one-half inch greater than the cavity of the finished forging. The punch 8 extends the cup cavity to full depth and the punch 8 is shaped to conform to the interior of the shell cavity and forms a centering recess 9 below the bottom face 7 formed by the piercing punch 4 that conforms to the interior of the finished forging. The depth of the recess 9 is much less than the depth of the cavity formed by the punch 4 and there is no appreciable drift of the second piercing punch, consequently the recess 9 is accurately centered with respect to the exterior of the cup. Both the punches 4 and 8 may be mounted on the crosshead 3 to be moved on the slide of the press from a position where the pot 5 and punch 4 are in axial alinement to a position in which the pot 5 and punch 8 are alined. If desired, the cup may be transferred from the pot 5 to an identical pot on a second press. The movable crosshead is preferred, however, where such equipment is available.

After the second piercing operation, the cup is subjected to a drawing operation on a draw bench 10 of conventional design which has a series of axially alined draw rings 11, 12, 13, 14, 15 and 16. Rings 11, 13, 15 and 16 are of progressively decreasing diameter; rings 12 and 14 are used as guide rings only. The draw bench is also provided with a horizontally movable mandrel 17 which is guided for axial movement through the draw rings and which is held in axial alinement with the draw rings during such movements. The mandrel 17 may be hydraulically operated and is of a size and shape to conform to the interior of a finished shell casing. The cup is placed on the mandrel 17 and centered with respect to the mandrel by the recess 9 in which the tip of the mandrel fits, the recess 9 being of sufficient depth to firmly hold the cup with its exterior cylindrical surface coaxial with the mandrel.

During the drawing operation the metal of the cup wall is caused to flow axially and also circumferentially from the thicker to the thinner portions thereof, forming a wall of uniform thickness around the mandrel.

As the cup passes through the successive die rings its external diameter is gradually reduced and the tubular wall thereof is axially elongated and drawn into conformity with the mandrel 17. The piercing punch 8 and the sizing mandrel 17 may be of identical size and shape and it is to be understood that the punch 8 may also serve as the sizing mandrel.

Since the finished forging has its exterior surface coaxial with the cavity, very close tolerances may be provided so that only a slight amount of metal is removed in the final machining operation and both the cost of machining and the scrap loss is greatly reduced. The accurate centering of the cavity also makes it possible to decrease the wall thickness and to thereby effect a further saving of metal. The manufacture of the shell forgings is also facilitated by reason of the fact that it is not necessary to resort to extraordinary precautions to prevent drift of the piercing punch, since considerable eccentricity can be corrected by the centering and drawing operations of the present invention.

It is to be understood that variations and modifications of the specific devices herein shown and described for purposes of illustration may be made without departing from the spirit of the invention.

What I claim is:

1. The herein described method of making shell forgings which comprises piercing a billet to form a cup with a cavity of less depth and greater diameter throughout its length than that of the finished forging, punching a recess in the cup bottom that is of a diameter at its top substantially less than that of the previously formed cup bottom, that is centered with respect to the exterior of the cup and that conforms to the lower end portion of the cavity of the finished forging, and forcing said cup axially through axially aligned dies with a member therein that conforms to the interior of the finished forging fitting in said centered recess to draw the tubular wall of said cup into conformity with said member.

2. The herein described method of making shell forgings which comprises piercing a billet to form a cup with a substantially flat bottomed cavity of less depth and greater diameter throughout its length than that of the finished forging, extending said cavity to full depth by punching a recess in the flat bottom thereof that is of a diameter at its top substantially less than that of the previously formed cup bottom, that is centered with respect to the exterior of the cup and that conforms to the lower end portion of the cavity of the finished forging, and forcing said cup axially through axially aligned dies with a member therein that conforms to the interior of the finished forging and that fits in said centered recess to draw the tubular wall of said cup into conformity with said member.

3. The herein described method of making shell forgings which comprises piercing a billet to form a cup with a cavity of less depth and greater diameter throughout its length than that of the finished forging, a recess in the cup bottom that is of a diameter at its top substantially less than that of the previously formed cup bottom, that is centered with respect to the exterior of the cup and that conforms to the lower end portion of the cavity of the finished forging, centering a sizing mandrel that conforms to the interior of the finished forging with respect to the exterior of the cup by inserting the tip thereof into said centered recess and forcing said blank and mandrel axially through draw rings that are in axial alignment and concentric with said mandrel to draw the tubular wall of the forging into engagement with the sizing mandrel.

4. The herein described method of making shell forgings which comprises piercing a billet to form a cup with a cavity of less depth and greater diameter throughout its length than that of the finished forging, extending the cavity to full depth by punching a recess in the flat bottom of the cup that is of a diameter at its top substantially less than that of the previously formed cup bottom, that is centered with respect to the exterior of the cup and that conforms to the lower end portion of the cavity of the finished forging, centering a sizing mandrel that conforms to the interior of a finished forging with respect to the exterior of the cup by inserting the mandrel into said centered recess, and drawing said cup with the mandrel therein to conform its wall to said mandrel.

5. The herein described method of making shell forgings which comprises piercing a billet to form a cup with a cavity of less depth and greater diameter throughout its length than that of the finished casing, extending the cavity to full depth by punching a recess in the flat bottom of the blank that is of a diameter at its top substantially less than that of the previously formed cup bottom, that is centered with respect to the exterior of the cup and that conforms to the lower end portion of the cavity of the finished forging, centering a sizing mandrel that conforms to the interior of a finished forging with respect to the exterior surface of the forging by inserting the mandrel into said centered recess, and advancing said mandrel with the cup thereon through drawing rings centered with respect to the mandrel to draw the tubular wall of said cup against the exterior of said mandrel and to provide a cylindrical external surface concentric with the mandrel.

PATRICK J. CULHANE, Jr.

References Cited in the file of this patent

UNITED STATES PATENTS

| Number | Name | Date |
|---|---|---|
| 1,292,106 | Shonnard | Jan. 21, 1919 |
| 2,278,325 | Layton | Mar. 31, 1942 |

FOREIGN PATENTS

| Number | Country | Date |
|---|---|---|
| 7,985 | Great Britain | A. D. 1889 |

OTHER REFERENCES

"Steel," issue of November 13, 1944.